(No Model.)
V. SLATER.
POCKET KNIFE.
No. 499,047. Patented June 6, 1893.
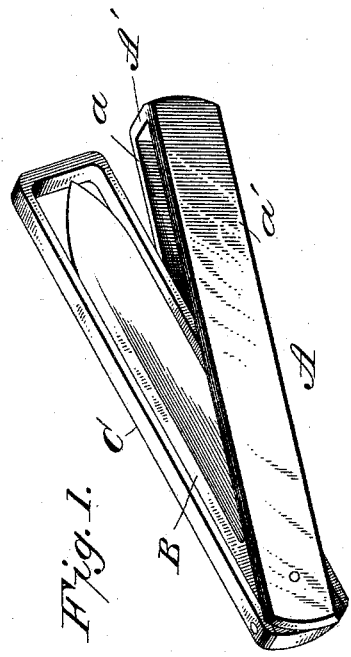
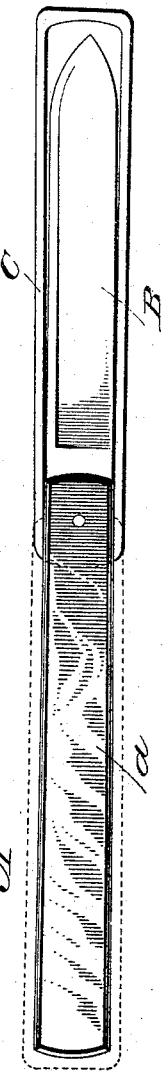
Witnesses
G. S. Elliott.
E. W. Johnson.
V. Slater,
Inventor
by
Attorney

UNITED STATES PATENT OFFICE.

VANDALIA SLATER, OF HUNT'S, NEW YORK.

POCKET-KNIFE.

SPECIFICATION forming part of Letters Patent No. 499,047, dated June 6, 1893.

Application filed December 8, 1892. Serial No. 454,532. (No model.)

*To all whom it may concern:*

Be it known that I, VANDALIA SLATER, a citizen of the United States of America, residing at Hunt's, in the county of Livingston and State of New York, have invented certain new and useful Improvements in Pocket-Knives; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in tool handles, especially designed for pocket-knives and similar implements; the object of the same being to provide a handle or blade-guard in which there is the absence of the usual springs, the blade or implement when folded in the handle being thoroughly protected; and the invention consists in providing the blade or implement, which is pivoted to the handle in the usual manner, with a loop adapted to be swung over the handle to hold the blade rigidly extended, and also fold within the handle with the blade to protect the same, as will be hereinafter fully set forth and particularly pointed out in the claim.

In the accompanying drawings, forming part of this specification: Figure 1 is a perspective view. Fig. 2 is a side elevation, showing the blade within the loop and swung outside of the handle.

A designates the handle, consisting of the parallel members $a$ and $a'$ and end connecting portion A'. Between the free ends of the side members of the handle the implement or knife-blade B is pivoted in the usual manner.

C designates a loop or guard, which is pivoted to the shank of the blade B by a pivot which is at right angles to the pivot which secures the blade to the handle; and this loop or guard is of such a length that it will inclose the blade or implement and when turned within the handle will carry said blade with it and protect the same. The loop being pivoted to the shank of the blade beyond the pivot can fold over the rear end of the handle when the blade is opened, and when so positioned the blade will be held rigid. By means of this device all springs are dispensed with, a strong connection between the blades and handle is provided, and the loop or guard not only forms a part of the handle when the implement is in use but serves to hold said implement against movement with respect to the handle.

Though in the accompanying drawings I have shown my invention applied to a pocket-knife, I do not wish to limit myself to such application. The handle may be provided with supplemental devices, as a foot-rule, while additional tools may be formed on the inner end of the shank of the blade or implement.

Having thus described my invention, what I claim as new, and desire to secure by Letters Patent, is—

In combination with a handle constructed substantially as shown and carrying a pivoted blade or implement, a loop pivoted to the shank of the blade or implement, the pivots connecting the loop and handle to the blade being at right angles with each other said loop being of such a width that it can be turned to lie within the handle when turned in one direction and lie over the handle to hold the blade projected when turned in the other direction, for the purpose set forth.

In testimony whereof I affix my signature in presence of two witnesses.

VANDALIA SLATER.

Witnesses:
A. J. NASH,
E. R. HINKLEY.